Nov. 23, 1965
W. R. SPIVEY ETAL
SEWING MEANS IN COMBINATION WITH CLOTH
STACKING AND TURNING MEANS
3,219,001
Filed March 5, 1962
5 Sheets-Sheet 1
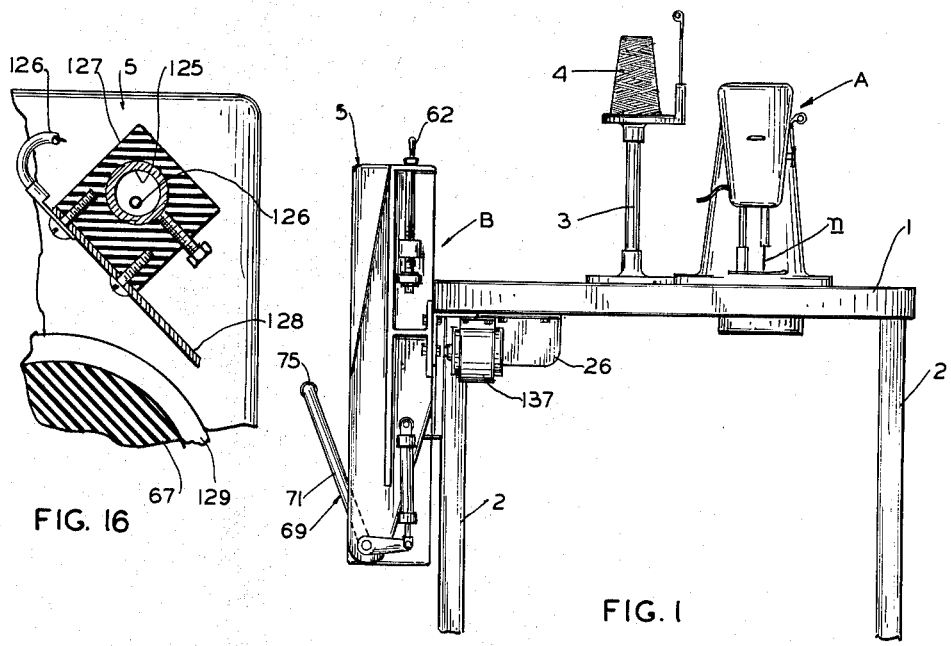
FIG. 16
FIG. 1
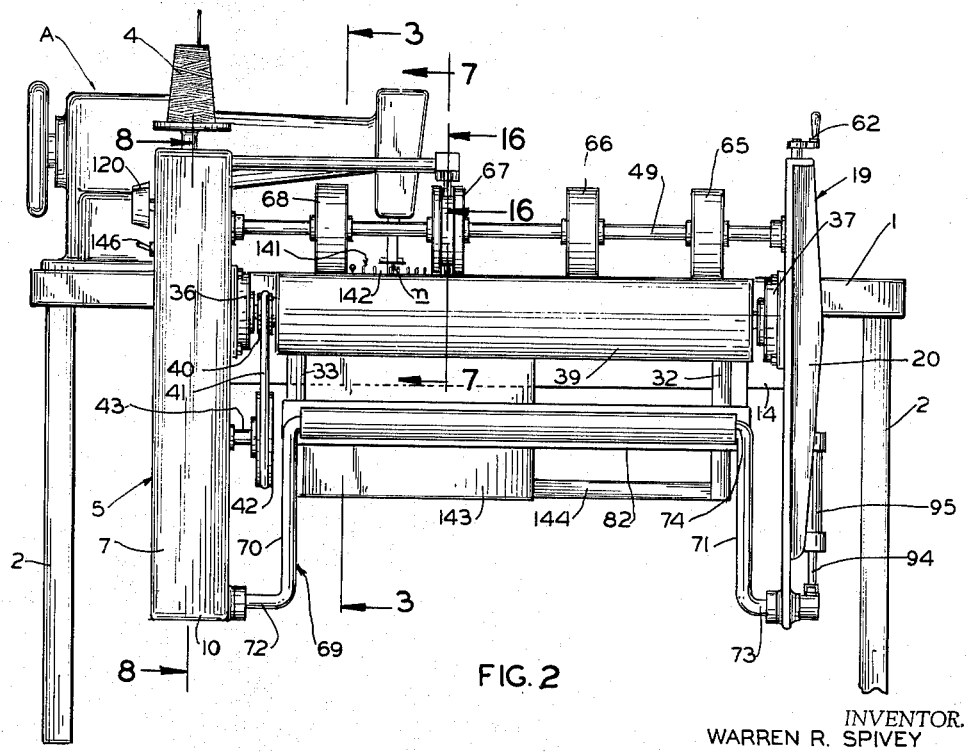
FIG. 2
INVENTOR.
WARREN R. SPIVEY
RICHARD G. WARFIELD
BY
*Alfred W. Petchoft*
ATTORNEY

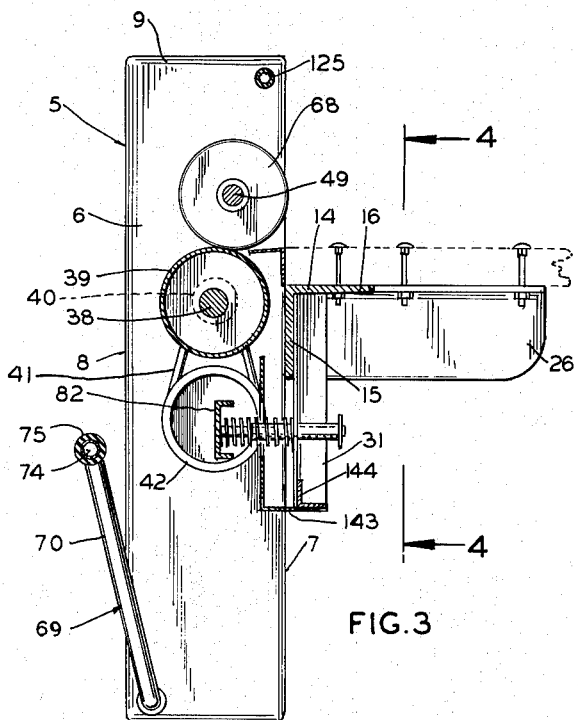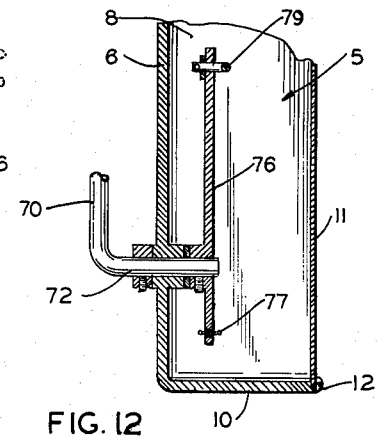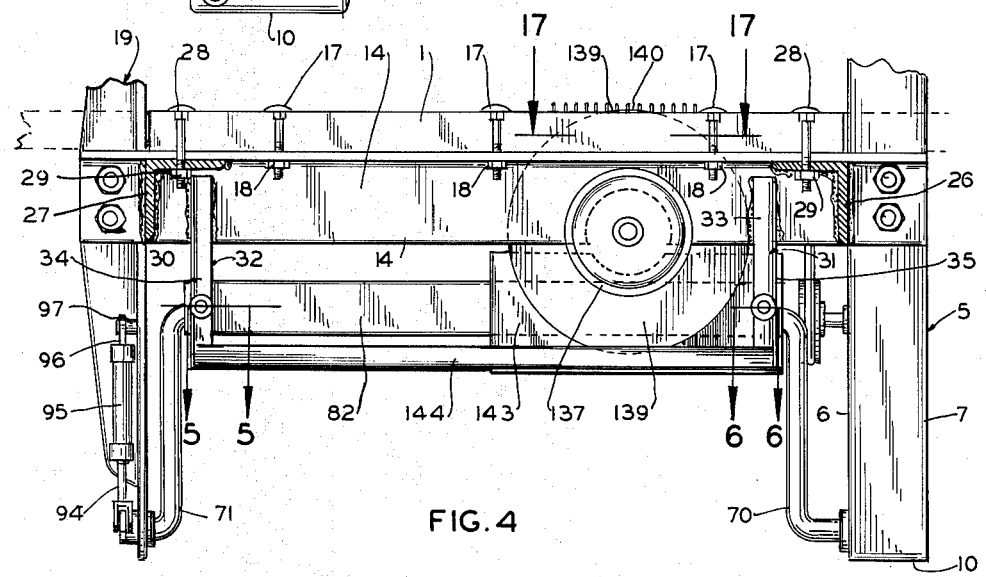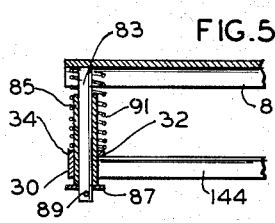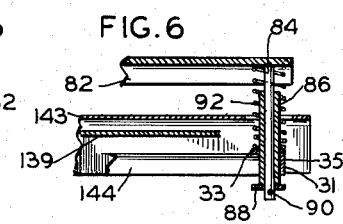

Nov. 23, 1965    W. R. SPIVEY ETAL    3,219,001
SEWING MEANS IN COMBINATION WITH CLOTH
STACKING AND TURNING MEANS
Filed March 5, 1962    5 Sheets-Sheet 3

INVENTOR.
WARREN R. SPIVEY
RICHARD G. WARFIELD
BY
ATTORNEY

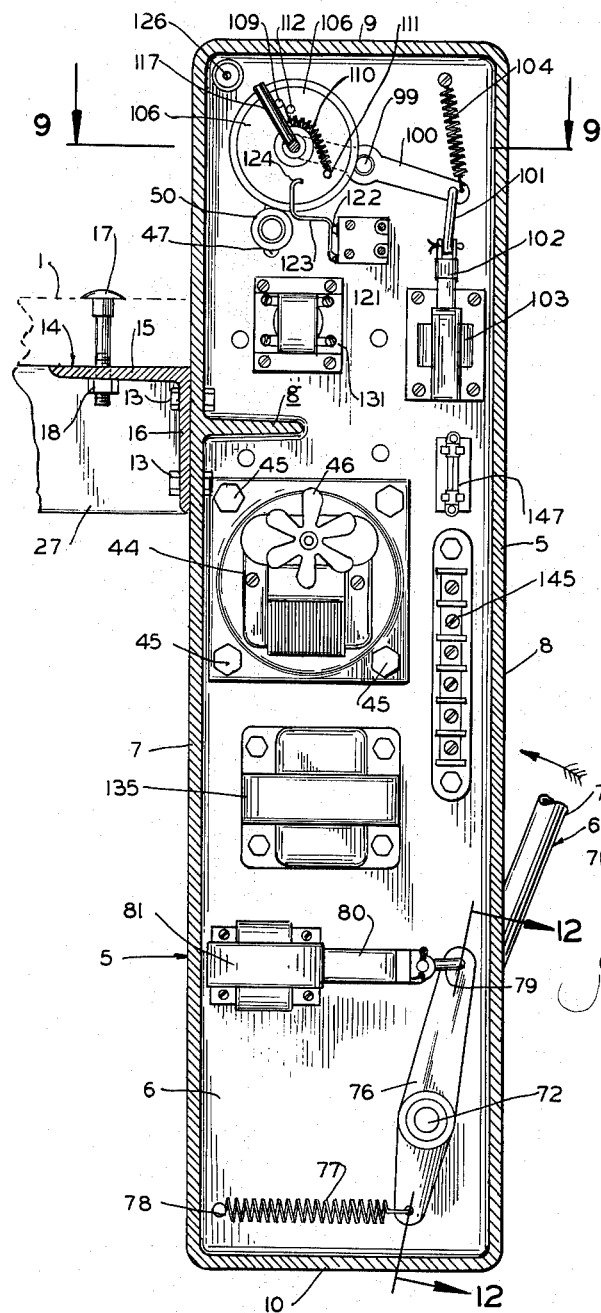
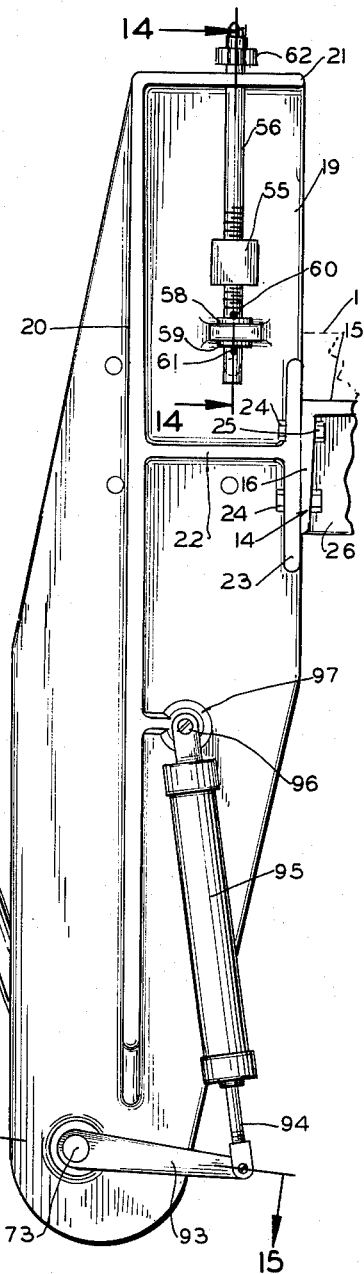
FIG. 8
FIG. 13
INVENTOR.
WARREN R. SPIVEY
RICHARD G. WARFIELD
BY
ATTORNEY

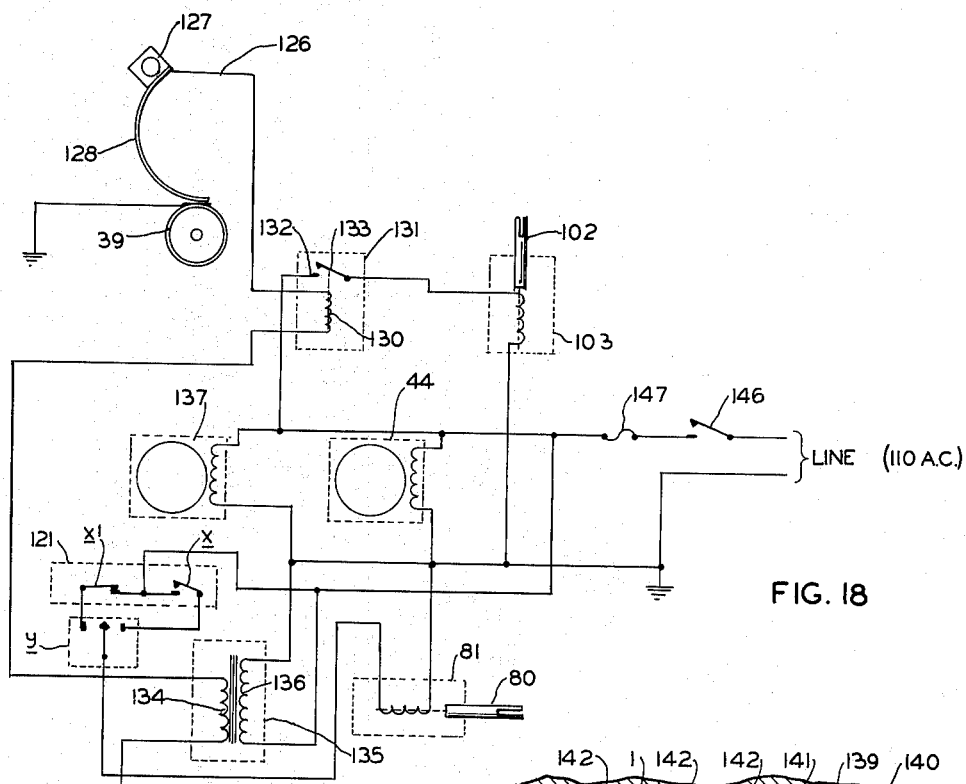
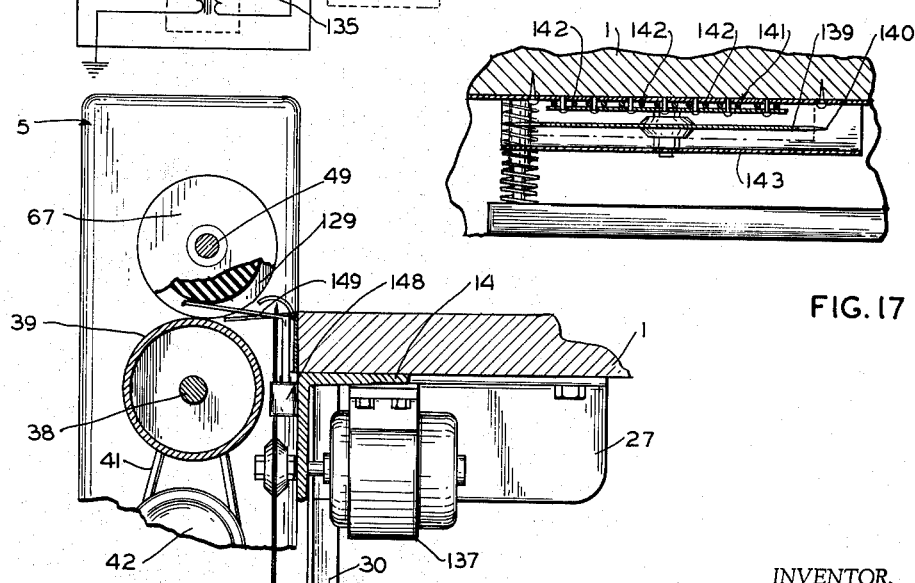

United States Patent Office 3,219,001
Patented Nov. 23, 1965

3,219,001
SEWING MEANS IN COMBINATION WITH CLOTH STACKING AND TURNING MEANS
Warren R. Spivey, Helena, and Richard G. Warfield, Lexa, Ark.
Filed Mar. 5, 1962, Ser. No. 177,575
12 Claims. (Cl. 112—2)

This invention relates in general to accessory equipment for use with commercial sewing machines and, more particularly, to a device for severing the connecting threads in a continuous or running seam between successive sections of cloth being seamed by a sewing machine and turning such sections as they are stacked.

In the manufacture of articles of apparel and similar sewn materials, sections of fabric are successively seamed by a sewing machine and, consequently, connected by a thin continuous chain of threads. Obviously, before subsequent garment-making operations can be carried out, it is necessary to sever the connecting chain between such successive sections and stack them. In many types of garment-making operations the sections must be turned upon a reverse side as they are stacked. Such cutting, stacking, and turning operations, when done manually as heretofore has been necessary, of course, materially increases the cost of the article.

It is, therefore, the primary object of the present invention to provide a device for automatically severing the continuous cord or so-called chain seam connecting sections of cloth successively stitched or seamed on a sewing machine and then stacking the sections in a neat easily handled pile.

It is also an object of the present invention to provide a device of the type stated which is capable of separating and stacking cloth panels or sections of fabric in a quick and efficient manner while either turning them or stacking them without turning as the particular sequence of garment-making operation may require.

It is another object of the present invention to provide a device of the type stated which can be readily attached to, or assembled in operative relationship upon a conventional sewing machine.

It is a further object of the present invention to provide a device of the type stated which is economical in cost, in maintenance, and in operation.

With the above and other objects in view, our invention resides in the novel features of form, construction, arrangement, and combination of parts presently described and pointed out in the claims.

In the accompanying drawings:

FIG. 1 is a side elevational view of a sewing machine equipped with the section separating and stacking device constructed in accordance with and embodying the present invention;

FIG. 2 is a rear elevational view of the sewing machine and accessory device shown in FIG. 1;

FIG. 3 is a fragmentary sectional view taken along line 3—3 of FIG. 2;

FIG. 4 is a fragmentary sectional view taken along line 4—4 of FIG. 3;

Figure 9:
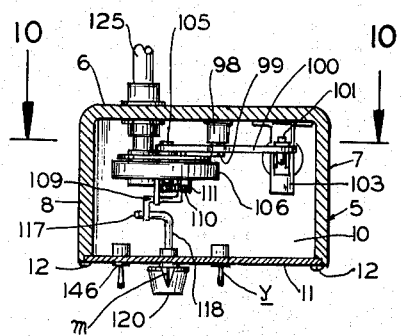
Figure 10:
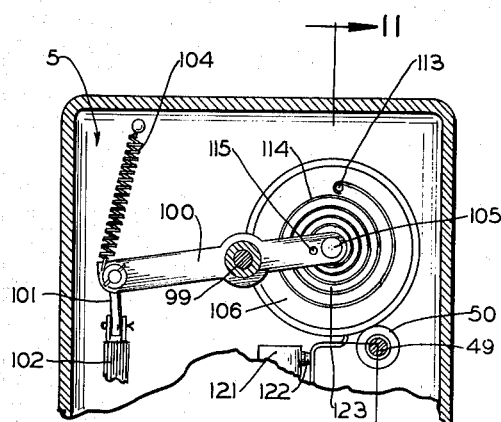
Figure 11:
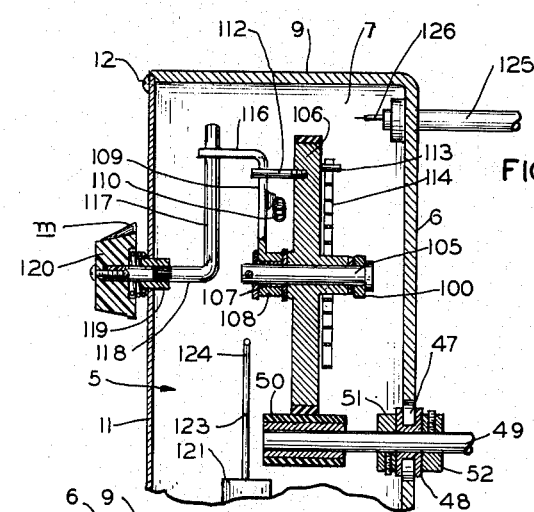
Figure 14:
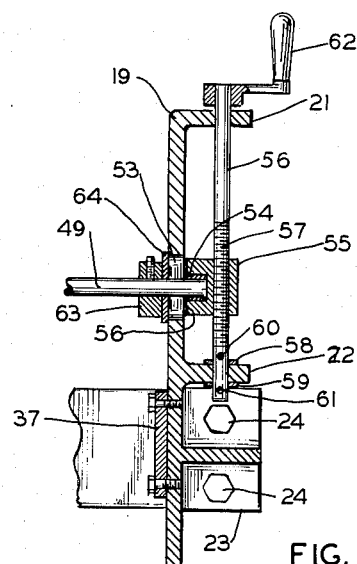
Figure 15:
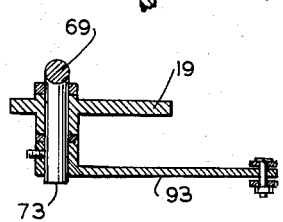
Figure 7:
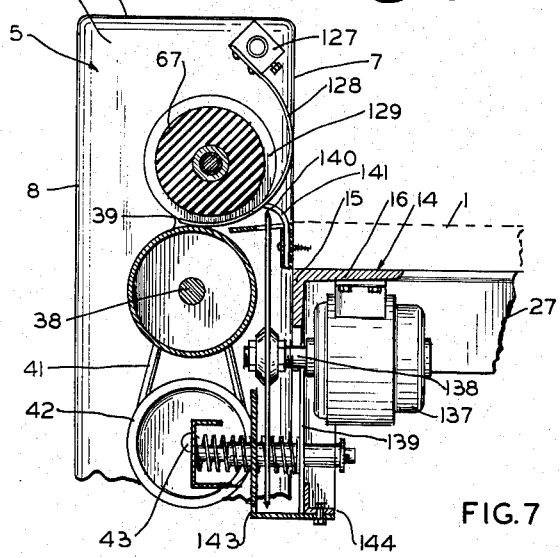

FIGS. 5 and 6 are fragmentary sectional views taken along lines 5—5 and 6—6, respectively, of FIG. 4;

FIGS. 7 and 8 are fragmentary sectional views taken along lines 7—7 and 8—8, respectively, of FIG. 2;

FIG. 9 is a transverse sectional view taken along line 9—9 of FIG. 8;

FIG. 10 is a fragmentary sectional view taken along line 10—10 of FIG. 9;

FIG. 11 is a fragmentary sectional view taken along line 11—11 of FIG. 10;

FIG. 12 is a fragmentary sectional view taken along line 12—12 of FIG. 8;

FIG. 13 is a side elevational view taken from the right side of the device as shown in FIG. 2;

FIGS. 14 and 15 are fragmentary sectional views taken along lines 14—14 and 15—15, respectively, of FIG. 13;

FIG. 16 is a fragmentary sectional view taken along line 16—16 of FIG. 2;

FIG. 17 is a fragmentary sectional view taken along line 17—17 of FIG. 4;

FIG. 18 is a digrammatic view of the electrical circuitry forming part of the present invention; and FIG. 19 is a fragmentary sectional view similar to FIG. 7 showing a modified form of switch construction forming a part of the present invention.

Referring now in more detail and be reference characters to the drawings which illustrate a preferred embodiment of the present invention, A designates a sewing machine mounted upon a tabletop 1 supported by legs 2 and having the usual spool stand 3 for supporting a spool 4 of thread. These components are conventional and, therefore, are not shown or described in detail herein.

Provided for securement to the rear longitudinal margin of the tabletop 1 (i.e., the left side of FIG. 1) is a separating and stacking device B comprising a vertical openfaced box-like housing 5 formed preferably as an aluminum casting and integrally including a base plate 6, a front wall 7, a rear wall 8, a top wall 9, and a bottom wall 10. Removably secured across the open face of the box-like housing 5 is a closure plate 11 held in place by screws 12. On its interior face the front wall 7 is integrally provided with a reinforcing gusset g which extends down into the base plate 6 and bolted at one end by means of bolts 13 to the front wall 7, in the region of the gusset g is a horizontal beam 14 formed perferably of angle iron or other suitable material and having a vertical flange 15 and a horizontal flange 16, the latter being, in turn, bolted upon the underside of the tabletop 1 by means of bolts 17 and nuts 18, as best seen in FIG. 4.

Similarly bolted to the other end of the beam 14, in spaced parallel relation to the base plate 6, is a vertical end plate 19 also formed as an aluminum casting and integrally provided on its outwardly presented lateral face with a vertical reinforcing flange 20 which is integrally joined to upper and lower horizontal flanges 21, 22, the latter, in turn, being joined at its forward end to a short vertical mounting flange 23 for receiving bolts 24 and nuts 25 by which the end plate 19 is secured to the beam 14. Welded to the forward face of the flange 15 and underface of the flange 16 are forwardly projecting auxiliary bracket members 26, 27, which are also secured to the underface of the tabletop 1 by means of bolts 28 and nuts 29, to provide further structural support and stability for the beam 14. Also welded to the forward face of the flange 15 and projecting vertically downwardly therefrom interiorly of the bracket members 26, 27, are angle sections 30, 31, having face flanges 32, 33, and leg flanges 34, 35, respectively, also as best seen in FIG. 4.

Bolted to the exterior face of the base plate 6 and the opposed face of the end plate 19 in horizontal alignment are two self-aligning bearings 36, 37, which operatively support the opposite ends of a shaft 38 and secured thereto is a diametrally enlarged drum-roller 39 having a very smooth highly polished exterior surface, the upper portion of which is tangential to a horizontal plane slightly below the plane of the upper or working surface of the tabletop 1. Also rigidly mounted on the shaft 38 is a driven pulley 40 connected by means of a belt 41 to a driving pulley 42 mounted on the outer end of a motor shaft 43 which projects through a suitable aperture in the base plate 6 and is part of an electric motor 44 which is mounted by means of bolts 45 to the interior face of the base plate 6. Preferably the motor is operatively provided with a small cooling fan 46.

Slidably mounted in a closed-end slot 47 formed in the base plate 6 is a first spool-shaped bearing 48 for operatively supporting one end of a horizontal shaft 49 which extends into the housing 5 and, in such interior end, is provided with an axially elongated rubber drive wheel 50. On opposite sides of the bearing 48, the shaft 49 is provided with set collars 51, 52, which prevent axial translation of the shaft 49. At its other end the shaft 49 extends loosely through a closed-end slot 53 formed in the end plate 19 and is journaled in a bearing sleeve 54 set into a housing 55 which has a flat vertical face 56 bearing slidably against the outwardly presented surface of the end plate 19 and is, in turn, threadedly mounted on an adjustment screw 57 operatively mounted in and extending vertically between the flanges 21, 22. At its lower end the adjustment screw 57 is held rotatively, but nonshiftably, in place by means of washers 58, 59, and cotter pins 60, 61, and at its upper end the adjustment screw 57 projects through the flange 21 and is provided at such upper end with a handle 62. The shaft 49 is also provided with a set collar 63 and a washer 64, the latter bearing against the inwardly presented vertical face of the end plate 19 and cooperating with the flat face 56 of the housing 55 to hold the latter in non-rotative relation to the adjustment screw 57. Thus, when the adjustment screw 57 is turned by the handle 62, the vertical position of the housing 55 and the shaft 49 will be varied within the limits defined by the slot 53. Keyed or otherwise secured to the shaft 49 in axially spaced relation are four rubber rollers 65, 66, 67, 68, which are of the same diametral size and are adapted to bear downwardly upon the drum roller 39.

Journaled at its opposite ends in the lower portions of the base-plate 6 and end-plate 19 is a U-shaped stacking bar 69 integrally including two legs 70, 71, provided at their lower ends with lateral stub shafts 72, 73, and being connected at their upper end by a horizontal bight 74 encased in a rubber roller 75. The length of the legs 70, 71, is such that the bight 74 and rubber sleeve 75 swing freely beneath, and in downwardly spaced relation to, the drum roller 39. The stub shaft 72 extends through the base plate 6 into the housing 5 and pinned to such interior end is a diametrally extending actuator-link 76 hooked, at its lower end, to the one end of a tension spring 77 which is, in turn, rigidly fastened at its other end to the base plate 6 by means of a pin 78. At its upper end the link 76 is rockably connected to one end of an intermediate link 79 which is rockably disposed, at its other end, in the external end of a solenoid plunger 80 operatively forming part of a solenoid 81 rigidly mounted on the interior face of the base-plate 6 within the housing 5. When the solenoid 81 is de-energized the spring 77 will hold the link 76 and the stacking bar 69 in outwardly swung position as shown in FIG. 8. When the solenoid 81 is energized the plunger 80 will be pulled in (i.e., to the left as shown in FIG. 8) thereby swinging the stacking-bar 69, in the direction indicated by the arrow in FIG. 8, into abutment against a horizontal stop bar 82 rigidly mounted on the rear ends of horizontal rods 83, 84, which are slidably disposed in horizontal support sleeves 85, 86, welded in and extending through the lower ends of the angle-sections 30, 31. At their forward ends, the rods 83, 84, are provided with stop-forming washers 87, 88, and cotter pins 89, 90. Encirclingly disposed around the support sleeves 85, 86, are compression springs 91, 92, by which the stop bar is resiliently biased to the rear so that when the stacking bar 69 is swung upwardly and forwardly, the stop bar 82 will afford an impact-cushioning abutment for the rubber sleeve 75.

As shown in FIGS. 2 and 13, the stub shaft 73 projects through the end plate 19 and is rigidly provided with a radial arm 93 which is operatively connected at its outer end with the lower end of a piston rod 94 forming part of a pneumatic impact-cushioning cylinder 95, the latter being rockably mounted at its upper end by means of a stud 96 upon a boss 97 cast into the outwardly presented face of end plate 19.

Formed integrally upon the interior face of the base-plate 6 and projecting inwardly into the housing 5 is a boss 98 having a stud 99 and rockably mounted thereon is a diametrally extending arm 100 which is operatively connected at its rear end, by means of an intermediate link 101 to a downwardly extending plunger 102 forming part of a solenoid 103. Also connected to the rear end of the arm 100, and extending upwardly therefrom, is a tension spring 104 which normally biases the rear end of the arm 100 upwardly. Mounted in and projecting from the opposite or forward end of the arm 100 is a stub shaft 105 and journaled thereon is a timing wheel 106 which bears against the rubber drive wheel 50. Whenever the solenoid 103 is energized, however, the plunger 102 is pulled downwardly lifting the timing wheel out of contact with the drive wheel 50. Also mounted on the stub shaft 105 externally of the timing wheel 106 is a bearing sleeve 107 and journaled thereon is a hub 108 having a radial arm 109 which is engaged in one end of a tension spring 110 attached at its other end by means of a horizontal pin 111 to the timing wheel 106. The spring 110 biases the arm 109 against another horizontal pin 112 fixed in the timing wheel 106 adjacent its outer periphery and in addition the spring 110 causes the arm 109 to rotate with the timing wheel 106 as the latter is rotated by the drive wheel 50, assuming, of course, that the shaft 49 is turning and the solenoid 103 is not energized so that the drive wheel 50 and timing wheel 106 are in contact.

The timing wheel 106 is also provided with a third horizontal pin 113 which projects from the opposite face thereof and engages the outer end of a spiral clock-type spring 114 which is attached at its inner end to a pin 115 set into the arm 100. Thus, as the timing wheel 106 is rotated by the drive wheel 50, the spring 114 will be wound up and when the timing wheel 106 is lifted out of contact with the drive wheel 50, the spring 114 will rotate the timing wheel 106 back to a selected initial position. In order to establish such initial position, the arm 109 is integrally provided, at its outer end, with a laterally projecting horizontal pin portion 116 which will abut against a radial arm 117 which is bent outwardly at its inner end to form a shaft portion 118 extending rotatably through a bearing sleeve 119 mounted in and extending through the closure plate 11. On its external end the shaft portion 118 is provided with a knob 120 having an index mark $m$ for visual cooperation with suitable graduations inscribed on the outer face of the closure plate 11. By manual rotation of the knob 120 the said initial position can be selected within appropriate limits, as will presently more fully appear.

Rigidly mounted on the interior face of the base-plate 6 beneath the timing wheel 106 is a microswitch 121 which is substantially conventional and includes a switch-operating plunger 122 and actuating arm 123, the latter being formed with a crook 124 located in the path of the arm 109. Internally the microswitch 121 is provided with a normally-open set of contacts $x$ and a normally-closed set of contacts $x'$ which can be alternatively placed in the circuit by a manually operable toggle switch $y$. As the timing wheel 106 rotates and the arm 109 is pulled around with it through the action of the spring 110, the arm will engage the crook 124 and close the microswitch 121. The arm 109 will remain in engagement with the crook 24 as the timing wheel continues its rotation and the spring 110 will stretch to permit this.

Mounted in the upper end of the base plate 6 and projecting horizontally above the shaft 49 is a conduit tube 125 which opens at one end into the housing 5 for receiving a single wire insulated conductor 126. At its outer end the conduit tube 125 supports a dielectric block 127 having a resilient arcuate contactor arm 128 which curves downwardly and rides contactively upon the drum roller 39 within an annular groove 129 formed upon the peripheral face of the roller 67. The contactor arm is electrically connected by the conductor 126 to a coil 130 in a relay 131 mounted within the housing 5 upon the base plate 6. The relay 131 also includes a switch contact 132 and switch blade 133 which are pulled into contact when the coil 130 is energized. Most of the electrical components are connected across a 110 volt A.C. line, as shown in FIG. 8, but the relay coil 130 and contact arm 128 are connected to a 6 volt supply provided by the secondary 134 of a power transformer 135 having a primary 136 which is itself connected to the 110 volt A.C. line.

Bolted to the underside of the flange 15 of horizontal beam 14 is a very high-speed electric motor 137 having a shaft 138 projecting rearwardly approximately in the same general plane as the needle $n$ of sewing machine A. Keyed or otherwise secured to the end of the shaft 138 is a rotary cutting disk 139 having a finely honed peripheral cutting edge 140 which projects upwardly a short distance above the upper or working surface of the tabletop 1 and lies within a slotted guard 141 consisting preferably of a plurality of closely spaced parallel wires 142 which collectively form a somewhat arcuate hump over which the fabric sections may pass unharmed. However, as soon as a filamentary chain seam between successive fabric sections passes over this hump, the chain seam will drop between the wires 142 and be severed by the cutting edge 140 of the disk 139. The lower half of the cutting disk 139 is conventionally protected by a guard plate 143 mounted on a crossbar 144 welded to the angle sections 30, 31.

For convenience, a conventional dielectric connector block 145 is mounted within the housing 5 to facilitate the wiring together of various components in the circuit configuration shown in FIG. 8. Also for convenience, the circuit is provided with a main switch 146 and fuse 147 mounted preferably in the closure plate 11.

In operation, the main switch is closed and the motors 44, 137, set in rotation. Initially the U-shaped stacking bar 69 will be in rearwardly swung position and the contactor arm will be in circuit-closing engagement with the drum roller 39. Thus, the relay coil 130 is energized thereby completing a circuit to the solenoid 103 causing it to pull in and hold the timing wheel 106 out of engagement with the drive wheel 50. Consequently, the timing wheel 106 is in initial position as determined by the setting of the knob 120. Meanwhile, the contact between the rollers 65, 66, 67, 68, and the polished surface of the drum-roller 39 is set by manual adjustment of the adjustment screw 56 so that there will be slippage and no rotation will be imparted to the rollers 65, 66, 67, 68, by the drum roller 39. Meanwhile, a fabric section is being seamed and fed through the sewing machine A. As soon as the rearwardly presented or so called leading edge of this fabric section comes between the drum roller 39 and the rollers 65, 66, 67, 68, it will be gripped thereby and the rollers 65, 66, 67, 68, will commence to rotate, turning the shaft 49. At this same instant, the cloth will break contact between the contactor arm 128 and the drum roller 39 deenergizing the solenoid 103 and dropping the timing wheel 106 into engagement with the drive wheel 50. The size of the timing wheel 106 and the rollers 65, 66, 67, 68, are selected so that the circumference of the timing wheel 106 will be proportionately greater than the length of the longest fabric section for which the separating and stacking device B is made.

Consequently, the knob 120 is set so that the arcuate distance between the arm 117 and the crook 124 is proportional to one-half the length of the particular series of fabric sections being stitched. Thus, when the fabric section passes beyond the drum roller 39 it will dangle down between the drum roller 39 and the stacking bar 69. As soon as half of such section passes over the drum roller 39, the arm 109 will close the microswitch 121 and cause the solenoid 81 to pull in thereby rocking the stacking bar 69 forwardly and gripping the vertically dangling portion of the fabric section between the sleeve 75 and stop bar 82. It will be noted by reference to FIG. 3 that the rearwardly presented face of the stop bar 82 is located forwardly of the vertical plane passing through the center line of the drum roller 39. Therefore, the last half of the fabric section will drop on the rear side of the sleeve 75 until it passes completely beyond the drum roller 39. Meanwhile, the chain seam will have been severed as above described so that the trailing edge of the fabric section will drop free and the fabric section will be draped or "stacked" in a U-shaped fold over the sleeve 75 of the stacking bar 69. As soon as the fabric section passes beyond the drum roller 39, contact again will be established with the contactor arm 128 and the solenoid 103 will be energized lifting the timing wheel 106 out of contact with the drive wheel 50. This permits the timing wheel to return to initial position and the microswitch 121 will open again breaking the circuit to the solenoid 81. When the solenoid 81 drops out the spring 77 will return the stacking bar 69 to initial position for reception and stacking of the next succeeding fabric section in a next identical cycle of operation. It should be noted that in the above-described operation the fabric section is turned upside down as it is stacked. In other words, the side which is down against the working surface of the tabletop 1 as the fabric section is being stitched will occupy an upwardly presented position when the fabric section comes to rest in stacked or draped position over the sleeve 75 of the stacking bar 69.

If, for some reason, this reversal or turning of the fabric sections is not desired the normally open microswitch 121 can be dropped out of the circuit by manual manipulation of the toggle switch $y$ so that the alternate normally closed microswitch contacts are in the circuit. This will, in effect, reverse the cycle of movement of the stacking bar 69 so that the latter will initially be in forward position against the stop bar 82 and when half of the fabric section has passed over the drum roller 39 the stacking bar 69 will swing rearwardly so that the fabric sections will be stacked right-side-up, so to speak.

If desired, the contactor arm 128 and associated structure may be eliminated by substituting a microswitch 148 therefor. This microswitch 148 may be mounted on the horizontal beam 14 beneath the tabletop 1 and is provided with an actuating arm 149 which extends upwardly into the groove 129. Thus, when the fabric sections are drawn between the drum roller 39 and the rollers 65, 66, 67, 68, the actuating arm 149 will be pushed downwardly closing the microswitch 148 with the same electrical result as when contact is made by the contactor arm 128. Since the microswitch 148 can be operated safely on 110 volt A.C., this modified arrangement makes it possible to eliminate the 6 volt circuit and the transformer 135 can also be eliminated.

In connection with the present invention, it should also be noted that, since the drum roller 39 is smooth surfaced, the fabric sections will slip thereon if held by the operator for any reason. For example, the operator may want to release the presser foot of the sewing machine and pull back a fabric section for restitching or something of that sort. This can readily be done with the drum roller 39. Such reverse pulling will, of course, reverse the rollers 65, 66, 67, 68, and the timing wheel 106 so that the latter will still correctly measure half distances when the fabric section is again released and allowed to proceed normally.

It should be understood that changes and modifications in the form, construction, arrangement, and combination of the several parts of the cloth stacking and turning machines may be made and substituted for those herein shown and described without departing from the nature and principle of our invention.

Having thus described our invention, what we claim and desired to secure by Letters Patent is:

1. In combination with a sewing machine mounted upon a supporting means having a work surface, a stacking device mounted upon the supporting means, cloth feeding means including a lower roller and upper rollers in juxtaposition to said lower roller, motor means driving said lower roller, said upper rollers being driven by said lower roller when a length of cloth is passed between said upper rollers and said lower roller, a first shaft mounting said upper rollers, a second shaft parallel to said first shaft, a timing wheel mounted on said second shaft and driven by said first shaft, a control circuit operatively associated with said timing wheel, said circuit including a solenoid, said timing wheel closing said circuit which operates said solenoid when half of the length of cloth passes between the lower roller and the upper rollers, said cloth feeding means being adapted for progressing the length of cloth and allowing the leading portion thereof to hang downwardly in freely depending position on the lower roller, and cloth-supporting means mounted in spaced relation to the downwardly hanging portion of the cloth, said solenoid being adapted for shifting the cloth-supporting means into engagement with the cloth and past the normal vertical plane in which the freely depending portion of the cloth hangs so that the remainder of the cloth will drop down on the other side of the cloth-supporting means whereby the cloth is finally draped across the cloth-supporting means.

2. In combination with a sewing machine mounted upon a supporting means having a work surface, a stacking device mounted upon the supporting means, cloth feeding means including a lower roller and upper rollers in juxtaposition to said lower roller, motor means driving said lower roller, said upper rollers being driven by said lower roller when a length of cloth is passed between said upper rollers and said lower roller, a first shaft mounting said upper rollers, a second shaft parallel to said first shaft, a timing wheel mounted on said second shaft and driven by said first shaft, a control circuit operatively associated with said timing wheel, said circuit including a solenoid, said timing wheel closing said circuit which operates said solenoid when half of the length of cloth passes between the lower roller and the upper rollers, said cloth feeding means being adapted for progressing the length of cloth and allowing the leading portion thereof to hang downwardly in freely depending position on the lower roller, and cloth-supporting means mounted in rearward relation to the downwardly hanging portion of the cloth, said solenoid being adapted for shifting the cloth-supporting means forward into engagement with the cloth and past the normal vertical plane in which the freely depending portion of the cloth hangs so that the remainder of the cloth will drop down on the other side of the cloth-supporting means whereby the cloth is finally draped across the cloth-supporting means.

3. In combination with a sewing machine mounted upon a supporting means having a work surface, a stacking device mounted upon the supporting means, cloth-feeding means for progressing a length of cloth and allowing the leading portion thereof to hang downwardly in freely depending position, cloth-supporting means mounted in rearwardly spaced relation to the downwardly hanging portion of the cloth, a movable stop bar mounted forwardly in spaced relation to the downwardly hanging portion of cloth, means for shifting the cloth-supporting means forward past the normal vertical plane in which the freely depending portion of the cloth hangs so as to grip the cloth between the stop bar and the cloth-supporting means so that the remainder of the cloth will drop down on the other side of the cloth-supporting means whereby the cloth is finally draped across the cloth-supporting means, and means for actuating the motive means in timed relation to the feeding movement of the cloth.

4. In combination with a sewing machine mounted upon a supporting means having a work surface, a stacking device mounted upon the supporting means, cloth-feeding means for progressing a series of successive seam-connected lengths of cloth and allowing the leading portion thereof to hang downwardly in freely depending position, cloth-supporting means rotatably mounted in rearwardly spaced relation to the downwardly hanging portion of the cloth, a movable stop bar mounted forwardly in spaced relation to the downwardly hanging portion of cloth, means for severing the seam connection between successive lengths of cloth, and motive means for rotating the cloth-supporting means forward past the normal vertical plane in which the freely depending portion of the cloth hangs so as to grip the cloth between the stop bar and the cloth-supporting means so that the remainder of the cloth will drop down on the other side of the cloth-supporting means whereby the cloth is finally draped across the cloth-supporting means.

5. In combination with a sewing machine mounted upon a supporting means having a work surface, a stacking device mounted upon the supporting means, cloth-feeding means including a smooth surface roller positioned for direct surface engagement with one face of a series of successive seam-connected lengths of cloth for progressing said lengths of cloth away from the sewing machine, roller means for direct surface engagement with the other face of the series of lengths of cloth for allowing the leading portion thereof to hang downwardly in freely depending position, cloth-supporting means rotatably mounted in rearwardly spaced relation to the downwardly hanging portion of the cloth, a movable stop bar mounted forwardly in spaced relation to the downwardly hanging portion of cloth, means for severing the seam-connection between successive lengths of cloth, and motive means for rotating the cloth-supporting means forward past the normal vertical plane in which the freely depending portion of the cloth hangs so as to grip the cloth between the stop bar and the cloth-supporting means so that the remainder of the cloth will drop down on the other side of the cloth-supporting means whereby the cloth is finally draped across the cloth-supporting means.

6. In combination with a sewing machine mounted upon a supporting means having a work surface, a stacking device mounted upon the supporting means, cloth-feeding means including a smooth surfaced roller positioned for direct surface engagement with one face of a series of successive seam-connected lengths of cloth for progressing said lengths of cloth away from the sewing machine, roller means for direct surface engagement with the other face of the series of lengths of cloth for allowing the leading portion thereof to hang downwardly in freely depending position, cloth-supporting means consisting of a U-shaped bar having a bight that is normally mounted in rearwardly spaced relation to the downwardly hanging portion of the cloth, a movable stop bar mounted forwardly in spaced relation to the downwardly hanging portion of cloth, means for severing the seam connection between successive lengths of cloth, and motive means for shifting the cloth-supporting means into engagement with the cloth and past the normal vertical plane in which the freely depending portion of the cloth hangs so as to grip the cloth between the stop bar and the cloth-supporting means, said motive means moving forward when one-half of the length of cloth has passed between the smooth surfaced roller and the roller means so that the remainder of the cloth will drop down on the other side of the cloth-supporting means whereby the cloth is finally draped across the cloth-supporting means.

7. In combination with a sewing machine mounted upon a supporting means having a work surface, a stacking device mounted upon the supporting means, cloth-feeding means including a smooth surfaced roller and roller means in juxtaposition to said smooth surfaced roller, motor means driving said smooth surface roller, said roller means being driven by said smooth surfaced roller when a length of cloth is passed between said roller means and said smooth surfaced roller, a first shaft mounting said roller means, a second shaft parallel to said first shaft, a timing wheel mounted on said second shaft and driven by said first shaft, a control circuit operatively associated with said timing wheel, said circuit including a solenoid, said timing wheel closing said circuit which operates said solenoid when half of the length of cloth passes between the smooth surfaced roller and the roller means, said cloth feeding means being adapted for progressing a series of successive seam-connected lengths of cloth away from the sewing machine and allowing the leading portion thereof to hang downwardly in freely depending position, cloth-supporting means consisting of a U-shaped bar having a horizontal bight which is normally mounted in rearwardly spaced relation to the downwardly hanging portion of the cloth prior to the time one-half of the length of cloth has moved between the smooth surfaced roller and the roller means, a movable stop bar mounted forwardly in spaced relation to the downwardly hanging portion of cloth, means for changing the normal position of the U-shaped bar so that it abuts the stop bar prior to the time one-half of the length of cloth has moved between the smooth surfaced roller and the roller means, means for severing the seam connection between successive lengths of cloth, and motive means for shifting the cloth-supporting means into engagement with the cloth and past the normal vertical plane in which the freely depending portion of the cloth hangs so that the remainder of the cloth will drop down on the other side of the cloth-supporting means whereby the cloth is finally draped across the cloth-supporting means.

8. In combination with a sewing machine mounted upon a supporting means having a work surface, a stacking device mounted upon the supporting means, cloth-feeding means including a lower roller and upper rollers in juxtaposition to said lower roller, motor means driving said lower roller, said upper rollers being driven by said lower roller when a length of cloth is passed between said upper rollers and said lower roller, a first shaft mounting said upper rollers, a second shaft parallel to said first shaft, a timing wheel mounted on said second shaft and driven by said first shaft, a control circuit operatively associated with said timing wheel, said circuit including a solenoid, said timing wheel closing said circuit which operates said solenoid when half of the length of cloth passes between the lower roller and the upper rollers, said cloth feeding means being adapted for progressing a series of successive seam-connected lengths of cloth and allowing the leading portion thereof to hang downwardly in freely depending position over the lower roller, cloth-supporting means mounted in spaced relation to the downwardly hanging portion of the cloth, means for severing the seam connection between successive lengths of cloth, and motive means which are started by the timing wheel for shifting the cloth-supporting means into engagement with the cloth and past the normal vertical plane in which the freely depending portion of the cloth hangs so that the remainder of the cloth will drop down on the other side of the cloth-supporting means whereby the cloth is finally draped across the cloth-supporting means.

9. In combination with a sewing machine mounted upon a supporting means having a work surface, a stacking device mounted upon the supporting means, cloth-feeding means including a relatively large motor-driven smooth surfaced roller positioned for direct surface engagement with one face of a series of successive seam-connected lengths of cloth for progressing said lengths of cloth away from the sewing machine, roller means for direct surface engagement with the other face of the series of lengths of cloth for allowing the leading portion thereof to hang downwardly in freely depending position over the smooth surfaced roller, cloth-supporting means mounted in spaced relation to the downwardly hanging portion of the cloth, means for severing the seam connection between successive lengths of cloth, motive means for shifting the cloth-supporting means into engagement with the cloth and past the normal vertical plane in which the freely depending portion of the cloth hangs so that the remainder of the cloth will drop down on the other side of the cloth-supporting means whereby the cloth is finally draped across the cloth-supporting means and a timing wheel operatively associated with said roller means for starting the motive means when one-half of the length of cloth has passed between the smooth surfaced roller and the roller means.

10. In combination with a sewing machine mounted upon a supporting means having a work surface, a stacking device mounted upon the supporting means, cloth-feeding means including a smooth surfaced roller positioned for direct surface engagement with one face of a series of successive seam-connected lengths of cloth for progressing said lengths of cloth away from the sewing machine, roller means for direct surface engagement with the other face of the series of lengths of cloth for allowing the leading portion thereof to hang downwardly in freely depending position over the smooth surfaced roller, electrical circuit means contacting the smooth surfaced roller prior to the insertion of a length of cloth between the smooth surfaced roller and the roller means, a timing wheel which is driven by the roller means, said timing wheel starting when a length of cloth is inserted between the smooth surfaced roller and the roller means which breaks the contact between the electrical circuit means and the smooth surfaced roller, cloth-supporting means mounted in spaced relation to the downwardly hanging portion of the cloth, motive means which are started by said timing wheel when one-half of the length of cloth has passed between the smooth surfaced roller and the roller means for shifting the cloth-supporting means into engagement with the cloth and past the normal vertical plane in which the freely depending portion of the cloth hangs so that the remainder of the cloth will drop down on the other side of the cloth-supporting means whereby the cloth is finally draped across the cloth-supporting means, and means for actuating the motive means in timed relation to the feeding movement of the cloth.

11. In combination with a sewing machine mounted upon a supporting means having a work surface, a stacking device mounted upon the supporting means, cloth-feeding means including a lower roller and upper rollers in juxtaposition to said lower roller, motor means driving said lower roller, said upper rollers being driven by said lower roller when a length of cloth is passed between said upper rollers and said lower roller, a first shaft mounting said upper rollers, a second shaft parallel to said first shaft, a timing wheel mounted on said second shaft and driven by said first shaft, a control circuit operatively associated with said timing wheel, said circuit including a solenoid, said timing wheel closing said circuit which operates said solenoid when half of the length of cloth passes between the lower roller and the upper rollers, said cloth feeding means being adapted for progressing a series of successive seam-connected lengths of cloth and allowing the leading portion thereof to hang downwardly in freely depending position, cloth-supporting means mounted in rearwardly spaced relation to the downwardly hanging portion of the cloth, means for severing the seam connection between successive lengths of cloth, said means including a rapidly rotating cutting disk and a slotted guard projecting upwardly over the work surface over which the cloth will slide without harm but through which the seam connection will drop into severing contact with the cutting disk, and motive means which are set into operation by the timing wheel when one-half of the length of cloth passes between the upper rollers and the lower roller, said motive means being adapted for shifting the cloth-supporting means into engagement with the cloth and past the normal vertical plane in which the freely depending portion of the cloth hangs so that the remainder of the cloth will drop down on the other side of the cloth-supporting means whereby the cloth is finally draped across the cloth-supporting means.

12. In combination with a sewing machine mounted upon a supporting means having a work surface, a stacking device mounted upon the supporting means, cloth-feeding means including a lower roller and upper rollers in juxtaposition to said lower roller, motor means driving said lower roller, said upper rollers being driven by said lower roller when a length of cloth is passed between said upper rollers and said lower roller, a first shaft mounting said upper rollers, a second shaft parallel to said first shaft, a timing wheel mounted on said second shaft and driven by said first shaft, a control circuit operatively associated with said timing wheel, said circuit including a solenoid, said timing wheel closing said circuit which operates said solenoid when half of the length of cloth passes between the lower roller and the upper rollers, said cloth-feeding means being adapted for progressing a series of successive seam-connected lengths of cloth and allowing the leading portion thereof to hang downwardly in freely depending position, cloth-supporting means mounted in rearwardly spaced relation to the downwardly hanging portion of the cloth, means for severing the seam connection between successive lengths of cloth, said means including a cutting means and a slotted guard projecting upwardly over the work surface over which the cloth will slide without harm but through which the seam connection will drop into severing contact with the cutting means, and motive means which are set into operation by the timing wheel when one-half of the length of cloth passes between the upper rollers and the lower roller, said motive means being adapted for shifting the cloth-supporting means into engagement with the cloth and past the normal vertical plane in which the freely depending portion of the cloth hangs so that the remainder of the cloth will drop down on the other side of the cloth-supporting means whereby the cloth is finally draped across the cloth-supporting means.

References Cited by the Examiner

UNITED STATES PATENTS

| | | | |
|---|---|---|---|
| 1,865,893 | 7/1932 | Ebert | 112—252 |
| 2,060,511 | 11/1936 | Learnard et al. | |
| 2,229,647 | 1/1941 | Gardner et al. | 112—214 |
| 2,766,045 | 10/1956 | Morgan et al. | 270—61 |
| 2,788,967 | 4/1957 | Jesus | 270—61 |
| 2,874,659 | 2/1959 | Kehrer. | |
| 3,052,469 | 9/1962 | Dale | 271—86 |
| 3,066,563 | 12/1962 | George et al. | |

FOREIGN PATENTS 603,710  6/1948  Great Britain.

JORDAN FRANKLIN, *Primary Examiner.*

DAVID J. WILLIAMOWSKY, *Examiner.*